March 14, 1939.  C. E. EVERETT  2,150,213
TRANSMISSION FOR ENSILAGE CUTTERS
Original Filed Nov. 9, 1933  2 Sheets-Sheet 2
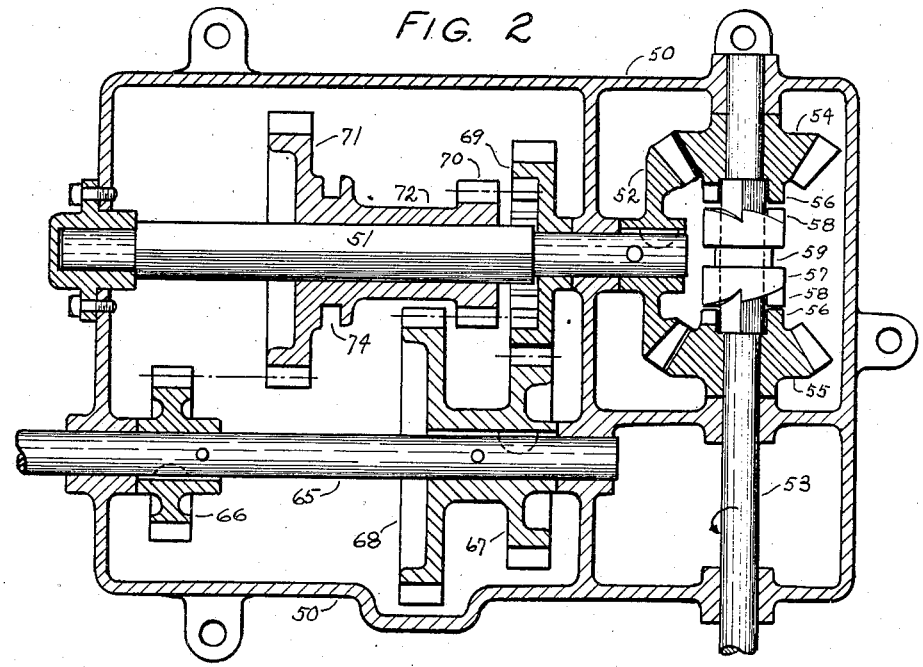
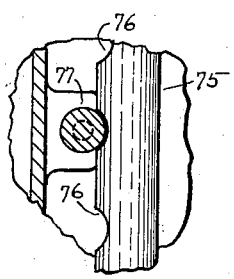
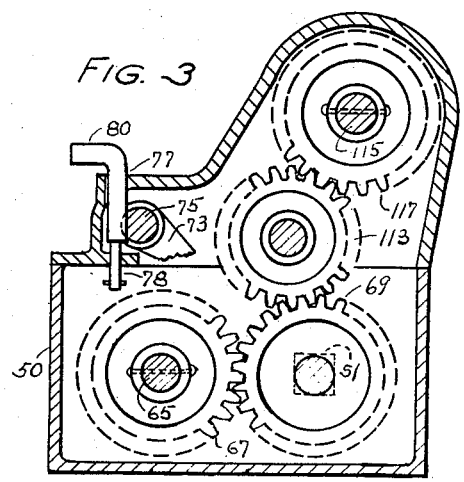
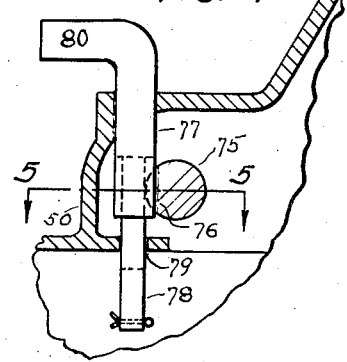
INVENTOR.
CHARLES E. EVERETT,
BY A. S. Krob
ATTORNEY Patented Mar. 14, 1939

2,150,213

UNITED STATES PATENT OFFICE 2,150,213

TRANSMISSION FOR ENSILAGE CUTTERS

Charles E. Everett, Racine, Wis., assignor to The Massey-Harris Company, Racine, Wis.

Original application November 9, 1933, Serial No. 697,253. Divided and this application June 8, 1936, Serial No. 84,160

2 Claims. (Cl. 74—333)

The present application is a division of my copending application which matured into issue No. 2,047,410, dated July 14, 1936.

Generally stated, the present invention relates to a transmission particularly adapted to drive the feeding mechanism of an ensilage cutter or the like.

The principal object of the present invention is to provide a transmission of the class which is fully inclosed in a gear housing and provided with reversing mechanism and a change speed and disengaging means whereby the feeding apparatus may be readily controlled by the operator.

An object of the present invention is to provide a mechanism which may be conveniently secured to the frame of an ensilage cutter or the like and conveniently operatively connected to the feeding mechanism.

To these and other useful ends, my invention resides in features of construction, the parts and combinations thereof or their equivalents, and mode of operation, as hereinafter set forth and claimed and shown in the accompanying drawings in which:

Fig. 2 is an enlarged horizontal section of the gears and their housing.

Fig. 3 is a section taken on line 3—3 of Figure 1.

Fig. 4 is an enlarged fractional section similar to Figure 3.

Fig. 5 is a fractional detail taken on line 5—5 of Figure 4.

Figure 1:
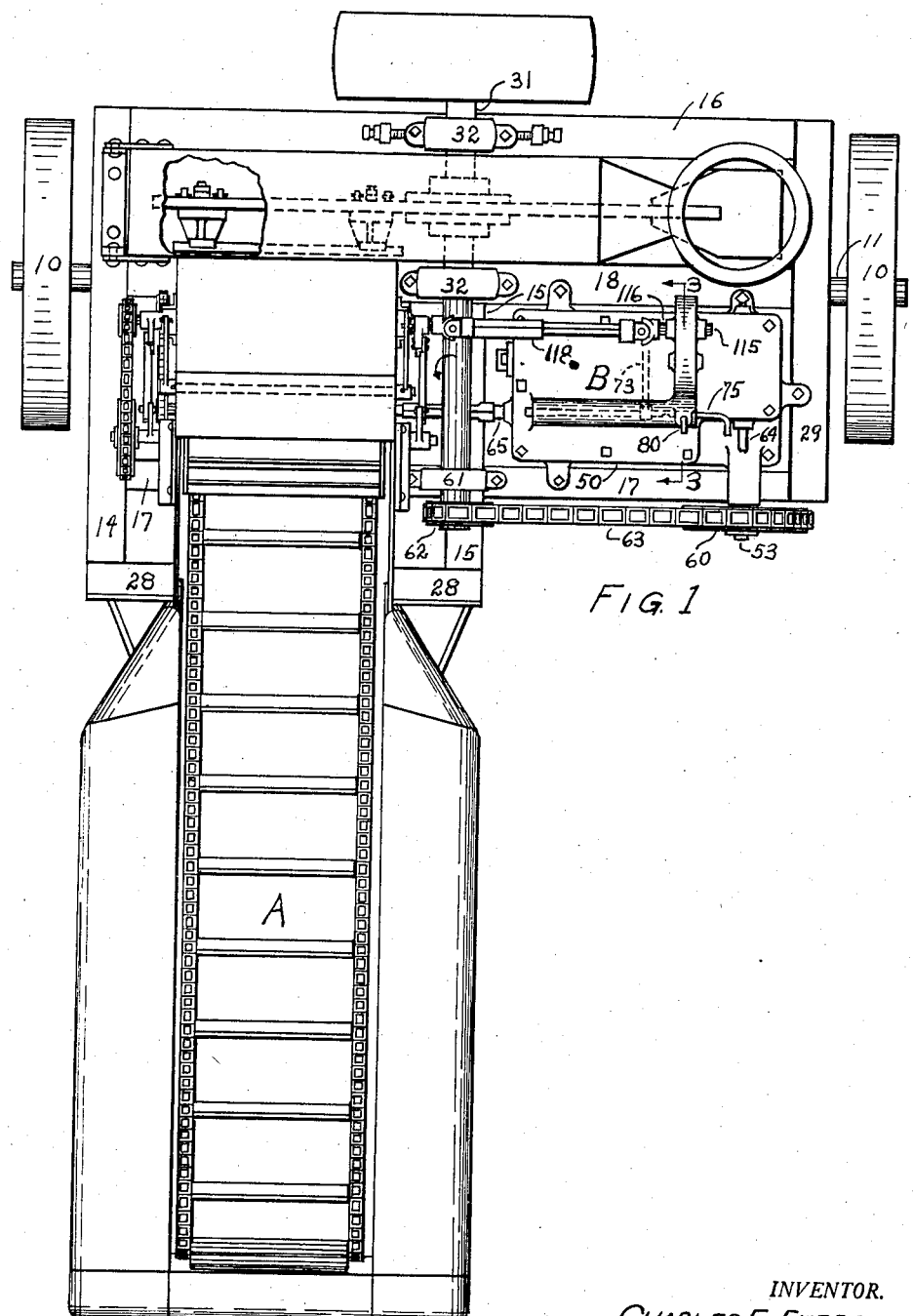
Fig. 1 is a top plan view of a conventional ensilage cutter being equipped with my improved transmission.

As thus illustrated, the frame structure to which my transmission is secured comprises carrying wheels 10—10 which are mounted on axle 11. The frame of the structure comprises transverse bars 16 and 17, middle cross bar 18 and longitudinal frame braces 14, 15 and 29 forming a structure suitable for supporting the feeding trough which, in its entirety is designated by reference character A. My improved transmission is designated by reference character B.

The cutting mechanism includes a drive shaft 31 which is rotatably mounted on frame bars 16, 17 and 18 by means of bearing blocks 32 and rear end bearing block 61.

My improved transmission B comprises a housing 50 which is attached to and positioned between frame bars 17 and 18 as illustrated. Primary transmission shaft 51 is journaled in this housing 50 as illustrated. On the driving end of this shaft I secure a bevel gear 52. A transmission shaft 53 is also journaled in the housing as illustrated and is provided with two free bevel pinions 54 and 55 which are adapted to operatively engage gear 52 and on opposite sides thereof. The inner portion of the hubs of pinions 54 and 55 are provided with jaws or teeth 56.

Between pinions 54 and 55 I slidably mount a splined collar 57 having jaws or teeth 58 on opposite ends thereof which are adapted to operatively engage teeth 56. This collar is slidably splined on shaft 53 in a space sufficiently long to provide a disengaged or neutral position.

Collar 57 is provided with a groove 59 which is operatively engaged by a shaft fork as will hereinafter appear.

I mount a sprocket 60 on the protruding end of shaft 53 and another sprocket 62 on the rear end of shaft 31. A chain 63 is adapted to operatively connect sprockets 60 and 62.

A conventional fork and an operating shaft 64 are provided by means of which the collar 57 may be shifted to thereby cause the teeth thereon to optionally engage the teeth on either pinions 54 or 55 or this collar may be shifted to a neutral position as illustrated in Figure 2. Shaft 64 is adapted to protrude through the housing forming means for connecting the usual manually controlled lever with which to disconnect the transmission or cause it to operate in either direction.

A secondary shaft 65 is suitably journaled in housing 50. This shaft is provided with three spaced gears 66, 67 and 68 of different diameter each of which is keyed to the shaft.

I provide a normally free gear 69 on shaft 51 which operatively engages gear 67. Gears 70 and 71 are provided with a common hub or sleeve 72 which is splined on shaft 51 but made free to move endwise. A shifting fork 73 (partially shown) is adapted to engage groove 74 and is made fast to a suitably mounted shaft 75 one end protruding through the housing and having a right angle bend as illustrated whereby the operator may manually shift the sleeve 72. Shaft 75 is provided with holding notches 76 suitably spaced and positioned whereby gears 70 and 71 may be held in any one of three operating positions or in the neutral position as illustrated in Figure 2.

Locking member 77 (see Figure 4) is provided with reduced extension 78 which is slidably held in an opening as at 79. The upper end of shaft 77 is slidably mounted in housing 50 and protrudes therethrough and having at its end a right angle portion 80 forming convenient means whereby the operator may lift shaft 77 out of engagement with notches 76 or leave it in the position shown so as to hold shaft 75 in its selected position.

Thus it will be seen that when it is desired to shift the gears on sleeve 72, shaft 77 is lifted and shaft 75 is moved manually into a desired position and member 77 is again dropped into its locking position as illustrated in Figure 4. The disengaged position of shaft 77 is illustrated by dotted lines. A cotter pin is provided on the end of extension 78 whereby shaft 77 will not lift higher than is necessary for disengaging the shaft. Notches 76 are spaced whereby the gears may be engaged in the following order: Members 70 and 69 medium speed, 70 and 68 low speed and 71 and 66 high speed.

Gear 69 is provided with internal teeth which are adapted to engage the teeth on gear 70. Thus when these two gears are engaged, shaft 65 will be driven through gears 67 and 69.

Main shaft 31 will turn clockwise when viewed from the pulley side of the machine, therefore shaft 53 will also turn clockwise (see curvilinear arrow in Figure 2) thus when pinion 55 is engaged, shaft 51 will turn counterclockwise when viewed from the gear end of the shaft. Thus when one of the bevel pinions are engaged three speeds in either direction are available. In the preferred design shaft 65 is adapted to operate the feeding mechanism A and the bottom feed roll of the ensilage cutter.

In cutters of the class it is necessary to provide a top feed roll which must necessarily travel over the material as it is fed into the cutter. This top feed roll is journaled in suitable bearings and held in yielding contact with the material. The manner of driving this top feed roll is as follows:

By referring to Figures 2 and 3 it will be seen that when any of the speeds are in operation, gear 69 will be turned either directly through gear 70 or indirectly through gear 67.

An idler gear 113 is rotatably positioned to operatively engage gear 69. A shaft 115 is suitably journaled in a housing extension the rear end protruding through the housing as at 116. Gear 117 is made fast to shaft 115 and operatively engages gear 113 thus shaft 115 will be turned in the opposite direction to shaft 65 and is therefore adapted to drive the upper feed roll in the proper direction by means of suitable universal joints and telescoping shaft 118.

Thus I provide a driving mechanism for the top feed roll and this top feed roll and the bottom feed roll will be driven in opposite directions and be suitable for feeding material into the cutter. It will be seen that feeding mechanism A will be driven suitable for moving the feed into the driving rolls and these rolls may be caused to move either forward or backward at any one of three speeds relative to the cutting head or main driving shaft 31 thereby providing a choice of three lengths for the ensilage. However, I provide simple means by which other speeds and lengths are available either by reversing the position of sprockets 60 and 62 or by supplying other sprockets and changing the length of chain 63. Thus I have provided a simple and completely inclosed gear housing having simple means for changing the speed and direction of travel.

It will be understood that many minor detail changes may be made without departing from the spirit and scope of the present invention as recited in the appended claims.

Clearly my improved transmission may be used for driving the feeding mechanism of other devices such as feed mills, feed grinders and the like.

Having thus shown and described my invention, I claim:

1. A transmission for implements of the class, comprising an elongated housing having a transversely positioned drive shaft at one end, one end of said shaft protruding through said housing, a primary shaft positioned on the same plane and at right angle to said drive shaft and having a selectively operating bevel gear connection therebetween whereby said primary shaft may be driven in either direction, a secondary shaft and a third shaft, a free gear having external and internal teeth mounted on said primary shaft and a gear secured to said third shaft operatively engaging the external teeth of said free gear through an idler gear, three variously sized, spaced gears secured to said secondary shaft, one of said three gears operatively engaging the outside teeth of said free gear, two spaced integral gears spline-mounted on said primary shaft and having means whereby one of said gears thereon may operatively engage either the internal teeth of said free gear or the middle gear of said three gears and whereby the other integral gear may operatively engage the other of said three gears, one end of said third and secondary shafts protruding through said housing whereby said third and secondary shafts always turn in opposite directions but may be reversed and selectively turned at three different speeds relative to said driving shaft.

2. A transmission of the class described, comprising a housing having therein at one end, a transversely positioned driving shaft, one end protruding through said housing, a primary shaft positioned on the same plane and at right angles to said driving shaft and having a bevel gear secured to the end adjacent said driving shaft, two bevel pinions mounted on said driving shaft and positioned on opposite sides of said bevel gear and having means whereby they may selectively be caused to drive said bevel gear in either direction, a secondary shaft and a third shaft, a free gear having internal and external teeth rotatably mounted on said primary shaft, a gear secured to said third shaft operatively engaging the external teeth of said free gear through an idler gear, two spaced differently sized gears secured to said secondary shaft, one of said two gears operatively engaging the outside teeth of said free gear, a spline-mounted gear on said primary shaft being adapted to engage either the internal teeth of said free gear or the other gear of said two gears, whereby said third and secondary shafts may be caused to turn at two different speeds in either direction relative to said driving shaft, said secondary and third shafts protruding through said housing thereby to act as driving means for devices exterior to said housing.

CHARLES E. EVERETT.